United States Patent [19]

Wunderlin

[11] 4,078,481
[45] Mar. 14, 1978

[54] JUICE EXTRACTING APPARATUS

[75] Inventor: Max Wunderlin, Jona, Switzerland

[73] Assignee: Turmix AG, Jona, Switzerland

[21] Appl. No.: 761,383

[22] Filed: Jan. 21, 1977

[51] Int. Cl.² .................. A23N 1/00; B02C 15/00; B04B 5/10; B26D 1/00
[52] U.S. Cl. .................. 99/511; 99/DIG. 8
[58] Field of Search ............... 99/510–513, 99/DIG. 8, 495, 496; 100/94, 213

[56] References Cited

U.S. PATENT DOCUMENTS

| | | | |
|---|---|---|---|
| 3,085,606 | 4/1963 | Moline | 99/511 |
| 3,519,047 | 7/1970 | Peterson et al. | 99/511 |
| 3,855,911 | 12/1974 | Feierabend | 99/511 |

*Primary Examiner*—Leonard D. Christian
*Attorney, Agent, or Firm*—Watson, Cole, Grindle & Watson

[57] ABSTRACT

A strainer basket driven by a motor-powered vertically rotating shaft and a grating disc spaced from the outlet of a feeder cylinder mounted eccentrically with respect to the power driven shaft in a juice extracting device are mounted on a shaft including a plate with a pivot. The strainer basket includes a central opening at its bottom for mounting over said pivot such that the strainer basket rests only in a limited area of the plate surrounding the pivot while being maintained at a distance with respect to the plate in radial areas extending beyond the limited area of contact. The strainer basket is movable with an unbalance of particulates therein out of its coaxial relationship with the plate such that the basket is tilted from the vertical. The strainer basket is resiliently pressed against the plate by a bolting mechanism which is actuable from an unlocking to a locking position by being rotated 90°.

3 Claims, 3 Drawing Figures

JUICE EXTRACTING APPARATUS

BACKGROUND OF THE INVENTION

This invention relates to a device to extract juice from vegetables and fruits, using a strainer basket, driven by a motor-powered, vertically rotating shaft, and a grating disc, which is located at a certain distance from the outlet of a feeder cylinder, mounted eccentrically to the power-driven pivot and rotating together with the strainer basket.

Prior art juice extraction devices function in such a way that the fruit and vegetable parts are grated by the grating disc which rotates at a short distance from the outlet of the feeder cylinder. Then the grated particles are forced by centrifugal force against the walls of the strainer basket, whereby the juice is separated from the pulp in the basket. Due to the non-continuous feeding of the fruit or vegetable parts, the possibility of an uneven distribution of particles along the inner wall of the strainer basket exists and can result in a high degree of unbalance in the quickly rotating strainer basket, which in turn will produce vibrations of the entire device, forcing the user to turn off the motor and to empty the strainer basket, although it has not yet reached its maximum capacity.

To eliminate this occurrence of an unbalance, several different constructions have been suggested, all of which must be considered to be too complex to be practical, or they contain parts that are submitted to excessive wear and tear. This is the case, for example, in such a device in which the grating disc is not connected tightly with the power-driven strainer basket. It is driven by friction in such a way that the grating disc can altar its position in relation to the strainer basket when an unbalance occurs. The lag created by the frictional drive varies greatly for the different products to be processed and therefore necessitates further measures to overcome these difficulties.

Another well-known device uses an elastic connection between the drive shaft and the strainer basket, each linked by a coupling part. This drive connection consists of five elastic joints, arranged in a circle, which could be spring elements for example, and allow the strainer basket to be tilted out of its coaxial position in relation to the power drive, so that in case of an unbalance the strainer basket can adjust itself to a somewhat inclined position. Thus the distance between the outlet of the feeder cylinder and the sector neighboring the unbalanced part of the strainer basket will be enlarged and less of the feeding material will be grated. This will now re-establish an even distribution within the strainer basket, whereby the elasticity of the coupling attempts to align the symmetrical axis of the grating disc and the strainer basket into an axial alignment with the power drive.

SUMMARY OF THE INVENTION

This known device, with a large amount of elastic joints and a ball joint between the two coupling parts, has proven itself useful in practice, but it is rather complicated. It is therefore the purpose of this invention to produce a correction of the unbalance, based on the same principle as described above, but by employing much simpler means. The bottom of the strainer basket, which is centered with its central opening on the pivot of a plate, rigidly connected to the power drive, rests on the plate only in the area surrounding the opening. Beyond this designated area the strainer basket is held radially at an equal distance from the plate. A counter force member, supported by a spring and attached to the pivot, presses the strainer basket against the plate. This also allows the basket to adjust to the force of an unbalance within it, from a coaxial position to the plate, to a point where the bottom of the strainer basket will make contact with the outer rim of the plate.

The counter force, which supports the spring, consists of a screw, screwed into the pivot of the plate, within a stepped hole. The spring is preferably a spiral spring around the thread of the screw, whereby one end is held by the head of the screw, while the other end rests against the bolting mechanism within the stepped hole, so that the bolt is under pressure to press the strainer basket against the plate, counter to the pivot.

In a preferred further development, the pivot for the plate is planed on opposite sides to allow the transport of the strainer basket and of the grating disc, positioned on the strainer bottom, whereby the centrally located openings at the bottom of the strainer basket and in the grating disc must be designed to match the corresponding sides of the planed pivot.

The bolting mechanism is planed in a like manner, so that its base becomes identical with the shape of the pivot. The strainer and the disc can be placed on the pivot in identical positions, and the pivot can be turned by 90° in a bolted position, in which the bolt mechanism is pressed with its two round, unplaned, edges pressed against the grating disc. This structure not only eliminates the unbalance by rather simple means, but also the usage of the device is greatly improved and simplified, since the procedure to remove the strainer basket for the purpose of emptying or cleaning requires only a quarter turn of the bolting mechanism. Most other known devices of this kind require the use of a screw-cap, which has to be loosened or tightened from the threaded pivot.

Further advantages and details of this invention will become apparent from the following description and the drawings of an exemplary embodiment of the invention wherein.

DETAILED DESCRIPTION

Figure 1:
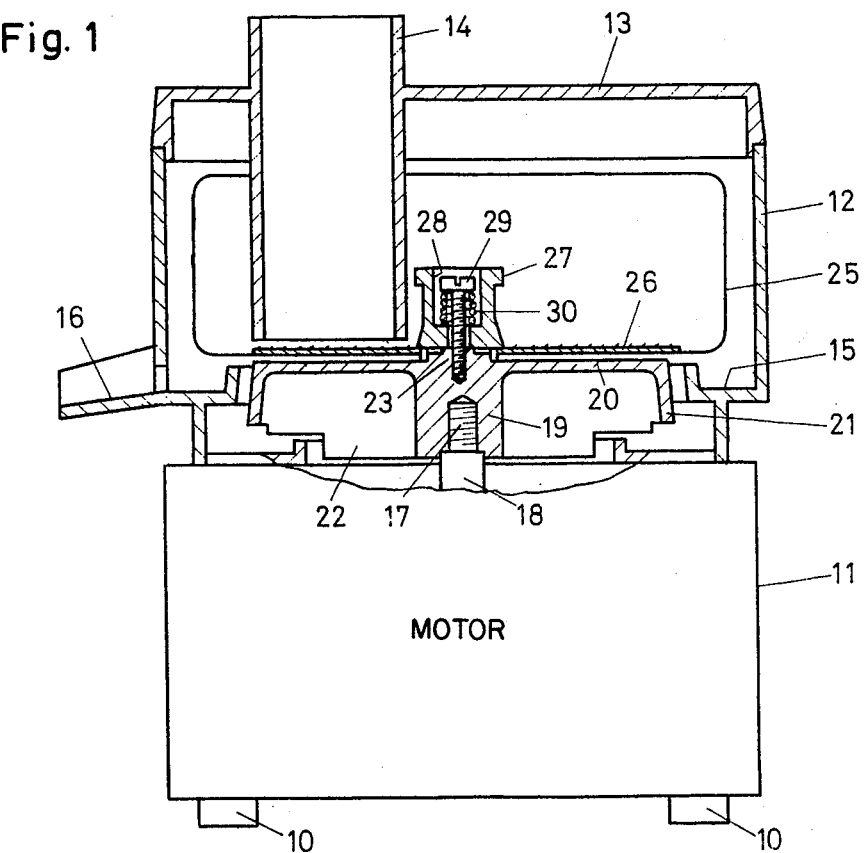
FIG. 1 is a schematic view which shows the juice extraction device to extract juice, partly in a longitudinal section, and partly in section.

The juice extraction device as shown in FIG. 1 consists of casing 11, equipped with feet 10, and contains an electric motor, not shown in the drawing. Juice collecting bowl 12 is placed on top of casing 11 and sealed by cover 13, to which feeder cylinder 14 has been attached. Juice collecting bowl 12 contains circular collecting trough 15, which opens on one side into outlet 16 for the juice.

Boss 19 of plate 20 is screwed to threaded top 17 of drive shaft 18. Under plate 20, between circumference area 21 and boss 19, radially placed stiffening ribs 22 are provided. Plate 20 has in its center pivot 23, which extends beyond the surface of the plate, and which is, as previously described and shown in FIG. 2, planed on opposite sides 24, to allow strainer basket 25, resting upon plate 20, and grating disc 26 to move in correspondence with the revolutions of the plate in such a way that the central openings of the strainer and the disc are congruous with the planed sides of the pivot. The height of pivot 23 is designed in such a way that its upper side remains somewhat lower than the upper side of grating disc 26, so that bolting mechanism 27, pressed down toward the pivot, will rest upon the upper side of grating disc 26 and thereby press it and the strainer basket against plate 20.

Bolting mechanism 27 is bored from end to end, in the form of stepped hole 28 to hold cylinder head screw 29, which is screwed into pivot 23 of the plate. Screw compression spring 30 is held at one end by the head of the screw and at the other end at the bottom of stepped hole 28, whereby the bolting mechanism is pressed down, so that it will hold the strainer and the disc against the plate.

Figure 2:
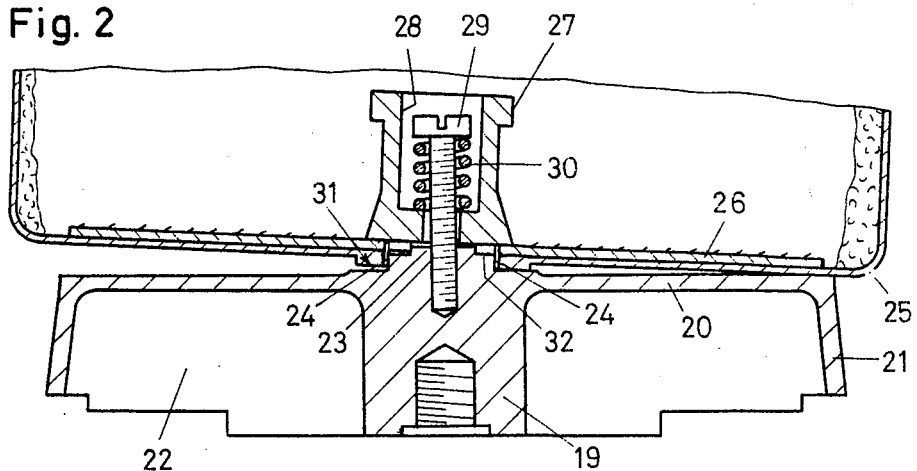
FIG. 2 is a sectional view of FIG. 1 with the strainer basket and the plate at an enlarged scale.

Strainer basket 25 rests only on the area immediately surrounding central opening 31 on the plate. The bearing surface area is marked by a ring-like projection at the bottom of basket 25 and/or on the surface of plate 20, as shown in FIG. 2. It is evident that the strainer basket is movable and will not tilt by the occurrence of an unbalance from its coaxial position, until the bottom of the strainer basket touches the outskirts of the plate. If balance is maintained, the strainer basket is held radially during normal use at a parallel distance from bearing surface area 31, a distance which measures 1 millimeter. This means that the divergence to the coaxial position is very minute, although shown in FIG. 2 in an exaggerated form, to demonstrate the operation of the components.

Figure 3:
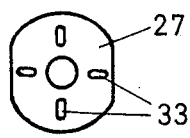
FIG. 3 is a detail of the bolt mechanism, to hold the strainer basket in place.

Bolting mechanism 27, in FIG. 3 shown from below, is also planed on its opposite sides, so that, in an identical position with pivot 23, which is equally planed, the strainer basket and the grating disc can be attached over the bolt to the pivot of the plate, without hindrance. After turning the bolting mechanism by 90°, the two edges will extend over the grating disc, which in turn presses the strainer basket to the plate under the influence of the compression spring. This position is shown in FIGS. 1 and 2. At the upper end of pivot 23 a total of four notches 32 are placed, staggered at 90° angles, which correspond with the protrusions at the bottom of bolting mechanism 27, so that it is arrested in both turning directions. The bolting mechanism described here could also be replaced by a screw-cap, which would be screwed to a threaded pivot, that reaches into the strainer basket and would press down the spiral spring with its lower rim.

The operation of the juice extraction device is as follows.

The items, which are to be de-juiced, are entered through feeder cylinder 14 and are pressed against grating disc 26 with the help of a plunger (not shown in the drawing). Thereby the items are particularized. Solids of the fruits and vegetables are held by the strainer walls, while the juice escapes through the perforation in the strainer to the collecting trough. If an uneven distribution of the pulp produces an unbalance in the strainer basket, the basket tilts as demonstrated in FIG. 2. The grating disc, rotating in unison with the strainer basket, will maintain a larger distance from the feeder cylinder in that sector of the strainer basket, that has produced the unbalance, while the diametrically opposed sector of the disc and the basket will be closest to the feeder. This will result in a lower amount of grating in the first mentioned sector, while the sector less distant to the feeder cylinder will correspondingly grate a higher percentage of particles. In this manner a balanced distribution of the pulp is obtained, thereby also eliminating vibrations. At the same time the necessity of emptying the strainer basket is reduced, compared to the devices not equipped with structure to avoid the unbalance problem.

What is claimed is:

1. A device for extracting juice from fruits and vegetables having a strainer basket driven by a motorpowered, vertically rotating shaft and a grating disc spaced from the outlet of a feeder cylinder mounted eccentrically with respect to the power-driven shaft and rotating with the strainer basket, the improvement comprising:

said shaft including a plate rigidly mounted thereon and having a pivot;

said strainer basket including a central opening at the bottom thereof for mounting over said pivot, said strainer basket resting only in a limited area of said plate surrounding said pivot and being maintained at a distance with respect to said plate in radial areas extending beyond said limited area, said strainer basket being movable at the occurrence of an unbalance of particulates therein out of its coaxial relationship with said plate such that said basket is tilted from the vertical; and means for resiliently pressing said strainer basket against said plate.

2. A device as in claim 1 wherein said means for resiliently pressing include a bolting mechanism having a stepped hole therein, a screw mounted within said stepped hole, and a spring mounted between said screw and the bottom of said stepped hole.

3. A device as in claim 1 wherein said pivot is planed on both sides to enable tilting of said strainer basket and said grating disc, said bolting mechanism being planed on opposite sides such that its base corresponds with the upper surface of the pivot, said bolting mechanism being adapted to be rotated 90° from a non-bolting position into a bolting position, and means for interlocking said bolting mechanism with respect to said pivot.

* * * * *

UNITED STATES PATENT OFFICE
CERTIFICATE OF CORRECTION

PATENT NO. : 4,078,481
DATED : March 14, 1978
INVENTOR(S) : Wunderlin

It is certified that error appears in the above-identified patent and that said Letters Patent are hereby corrected as shown below:

[30] Foreign Application Priority Data

January 21, 1976  Switzerland..........710/76

Signed and Sealed this

Twenty-second Day of August 1978

[SEAL]

Attest:

RUTH C. MASON
Attesting Officer

DONALD W. BANNER
Commissioner of Patents and Trademarks